United States Patent [19]
Masclet et al.

[11] 3,899,147
[45] Aug. 12, 1975

[54] TRAILING-WHEEL UNDERCARRIAGE TRAIN

[75] Inventors: Jean Masclet, Paris; Andre Turiot, Morsang S/Orge, both of France

[73] Assignee: Messier-Hispano, Paris, France

[22] Filed: Mar. 1, 1974

[21] Appl. No.: 447,245

[30] Foreign Application Priority Data
Mar. 5, 1973 France .............................. 73.07790

[52] U.S. Cl. ............................................ 244/102 R
[51] Int. Cl.² ......................................... B64C 25/12
[58] Field of Search ........ 244/100 R, 102 R, 102 A, 244/102 SL, 102 SS, 103 R, 103 W, 104 R, 104 FP

[56] References Cited
UNITED STATES PATENTS

| | | | |
|---|---|---|---|
| 3,083,937 | 4/1963 | Bainbridge et al. | 244/104 R |
| 3,322,376 | 5/1967 | Neilson et al. | 244/104 R |

FOREIGN PATENTS OR APPLICATIONS

| | | | |
|---|---|---|---|
| 1,090,016 | 3/1955 | France | 244/102 R |
| 704,080 | 2/1954 | United Kingdom | 244/102 SL |
| 946,653 | 6/1949 | France | 244/102 R |
| 899,111 | 6/1962 | United Kingdom | 244/104 R |

Primary Examiner—Trygve M. Blix
Assistant Examiner—Galen L. Barefoot
Attorney, Agent, or Firm—Haseltine, Lake & Waters

[57] ABSTRACT

Trailing-wheel undercarriage train for an aircraft having a fuselage, which comprises two laterally retractable undercarriages, pivotally mounted symmetrically on either side of the fuselage, each including a rigid leg casing on which a pivot arm is pivotally mounted; the pivot arm carrying at least one wheel with which it constitutes an assembly, and also carrying a lower pivot of a damper disposed rearwardly of the leg casing, and whose upper end is pivotally connected to the lever which is pivotable during the undercarriage-train lifting movement, relative to the casing; the lever being connected, on the one hand, to a strut assembly directly pivoted on the aircraft and, on the other hand, to the pivot arm by way of a telescopic strut which is reduced in length, upon landing and taxying of the aircraft, by the reaction of the ground, without opposing any resistance; but which causes retracting of the pivot arm-wheel assembly along the casing, during the lifting movement of the undercarriage train, under the action of an operating jack, thereby compressing the damper.

9 Claims, 5 Drawing Figures

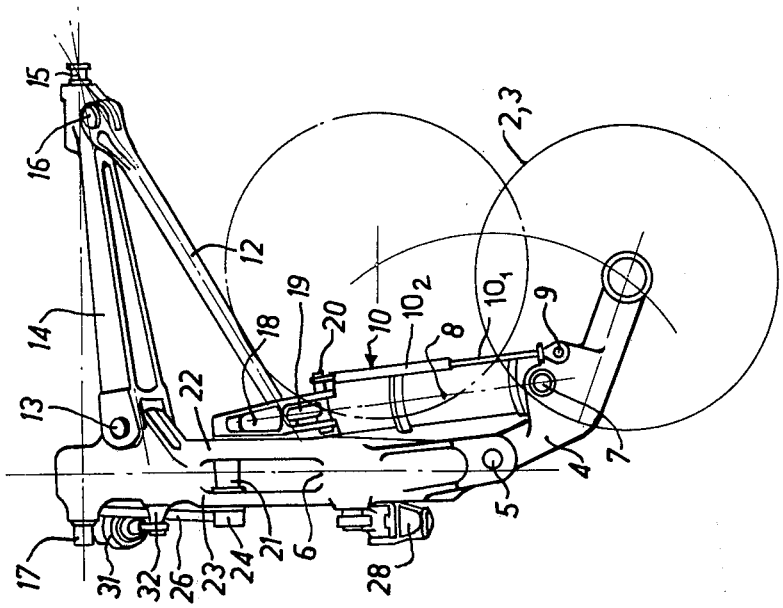
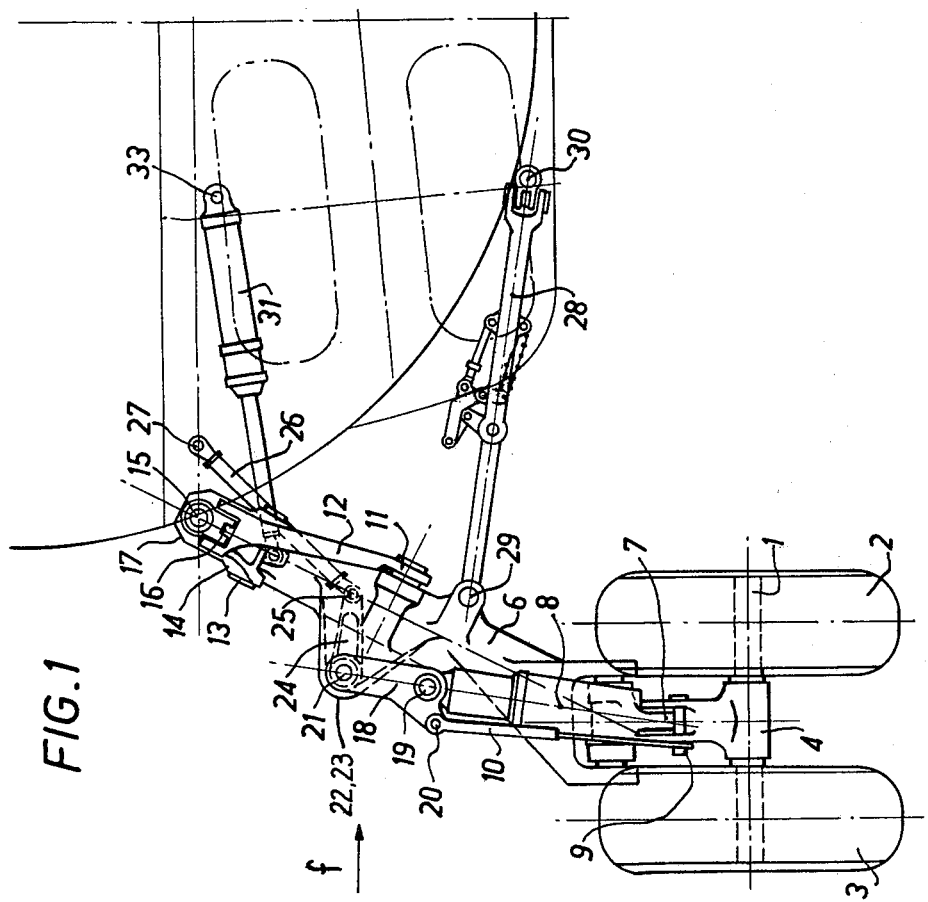

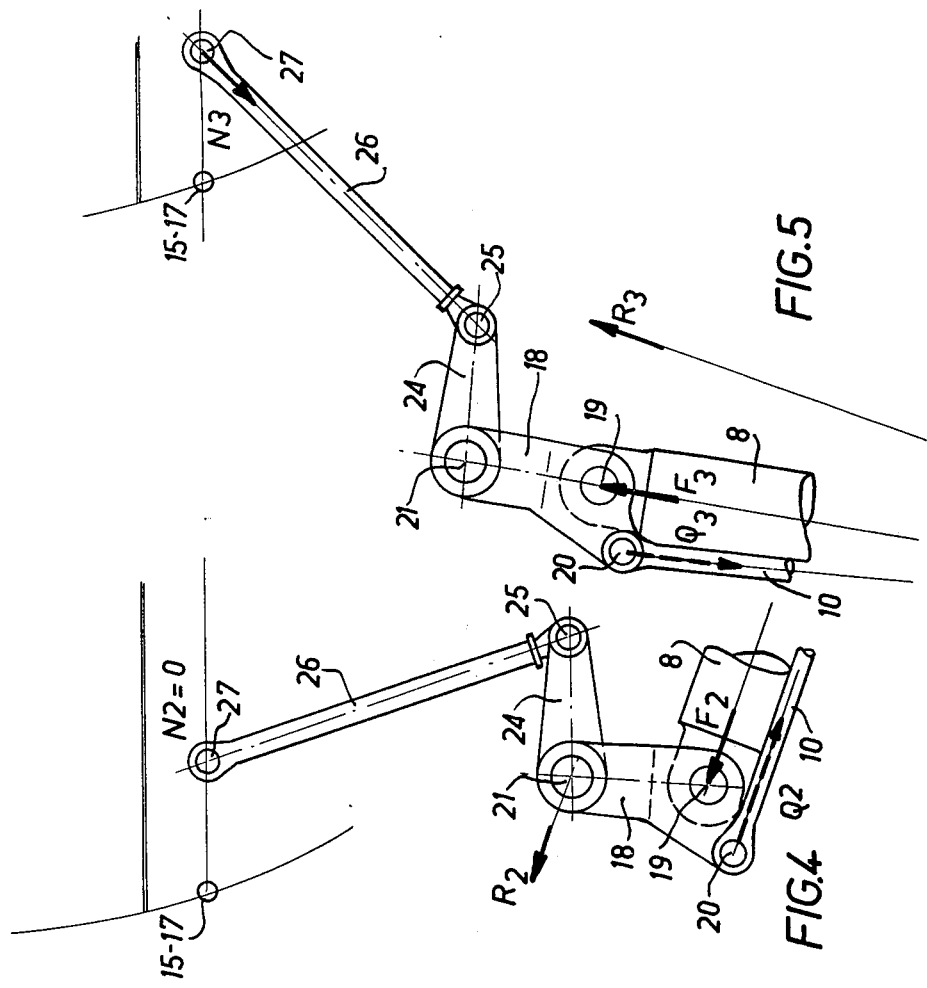

TRAILING-WHEEL UNDERCARRIAGE TRAIN

The present invention concerns a trailing-wheel undercarriage train, that is to say, an undercarriage train in which the wheels are displaced relative to the general axis of the undercarriage, in the opposite direction to the direction of movement of the aircraft. The invention concerns more particularly a trailing-wheel undercarriage train in which the wheels of the main right-hand and left-hand undercarriages are retractable into the aircraft fuselage.

In high-wing aircraft, it is often necessary to use a fuselage undercarriage train, that is to say, the main undercarriages are pivotally mounted on the fuselage, and in the undercarriage extended position the wheels are in an out-of-perpendicular position relative to the pivot axis, so as to provide a sufficient track to ensure that the aircraft has good stability. The pivot axis of each of the undercarriages on the fuselage is generally parallel to the centre line of the aircraft, in order to permit lateral lifting and retraction of the wheels below the floor of the aircraft. Because of the track selected, and the height of the undercarriages, it may be necessary to reduce the length of each undercarriage during the lifting movement, so that the wheels of the right-hand and left-hand undercarriages are housed in the aircraft close to the plane of symmetry thereof, without interfering with each other.

The example of the fuselage train is only selected by way of example, but it is obvious that such a problem can also arise in the case of a wing undercarriage train.

French patent No. 1090016 discloses a solution for resolving this problem in the case of a trailing-wheel undercarriage train comprising two laterally retractable undercarriages which are pivotally mounted symmetrically on respective sides of the fuselage and which each comprise a rigid leg casing on which a pivot arm is pivotally mounted, the pivot arm carrying the wheels and also carrying the lower pivot of a damper.

The reduction in length of the undercarriage during retraction is produced by retracting the wheels by applying a pulling force on the damper, which then acts like a strut of constant length, by virtue of the addition of a lever which carries the upper pivot of the damper and which pivots during the lifting movement under the action of a strut assembly connected to the lateral bracing system of the undercarriage.

The present invention provides a more advantageous solution to this problem and for this purpose it concerns an undercarriage train which is characterised in that said lever is connected on the one hand to a strut assembly directly pivoted on the aircraft and on the other hand to the pivot arm by way of a telescopic strut which, upon landing and taxying, is reduced in length without opposing any resistance but which, during the lifting movement of the train under the action of an operating jack, causes retraction of the pivot arm-wheel assembly along the leg casing, thereby compressing the damper.

Thus, such an undercarriage has its length substantially reduced in the course of the undercarriage lifting movement, so that there is no danger that the wheels of the right-hand and left-hand undercarriages interfere with each other when they are in the undercarriage retracted position. In addition, when the undercarriage is lowered, the energy which was stored in the damper, due to the compression thereof, contributes to assisting the operating jack to extend and lock the undercarriage, and, in the event that the operating jack should become defective, this energy would be sufficient, in itself, to complete the undercarriage extension and locking action.

A preferred embodiment of the invention will now be described by way of non-limiting example with reference to the accompanying drawings, in which:

FIG. 1 is an elevational view, of the inventive undercarriage train from the rear of the aircraft, of the left-hand undercarriage in the undercarriage extended position; FIG. 2 is a side view in the direction of the arrow f of the undercarriage of FIG. 1; and FIGS. 3 to 5 are views on a larger scale showing the positions of the lever carrying damper, respectively in the undercarriage retracted position, in the position in which the damper has zero action, and in the undercarriage extended position.

Referring to FIGS. 1 and 2, the undercarriage is provided with two wheels 2 and 3 in a side-by-side arrangement, but it is apparent that the invention can be used in the case where the wheels are arranged differently and in which the undercarriage comprises only a single wheel.

An axle 1 carrying the wheels 2 and 3 is mounted on a pivot arm 4 which is pivotally mounted at 5 on a leg casing 6. The arm 4 has a mounting 7 to which the lower end of a damper 8 is pivotally connected.

Rearwardly the leg casing 6 carries a shaft 11 on which a bar 12 is fixed, and a shaft 13 on which a forked lever 14 is fixed. In its rearward part the forked lever 14 has a horizontal pivot bearing 15 which is pivoted on the aircraft, and a mounting 16 for the bar 12. The arrangement is such that the geometrical axis of the forked lever 14 and that of the bar 12 meet at the point of bearing 15. In a forward direction, the leg casing 6 comprises a horizontal pivot bearing 17 which is aligned with the pivot bearing 15, the geometric aixs 15–17 being the axis of pivotal mounting of the undercarriage leg on the aircraft. The damper 8 is pivotally connected at its upper end to a lever 18 by way of a shaft 19.

In accordance with the invention, the undercarriage also comprises a telescopic strut 10 having a rod $10_1$ and a cylinder $10_2$, which are respectively pivotally connected to a mounting 9 on the arm 4 and to the lever 18 by means of a shaft 20. In FIG. 2, the mounting 9 is at a lower level than the level of the mounting 7, but it could also be above the mounting 7.

In the embodiment illustrated, the lever 18 carries a spindle 21 whose geometric axis is parallel to the axis 15–17, although this condition is not necessary. The spindle 21 is pivotally carried in mountings 22 and 23 formed on the leg casing 6. A lever member 24 is fixed with respect to the spindle 21 and at 25 carries the mounting of a strut 26 which is itself pivotally connected to the aircraft at 27. In FIG. 2, the lever member 24 and the lever 18 are mounted at the ends of the spindle 21, but it is also possible for the lever member 24 to be behind the leg casing 6 and to be formed in one piece with the lever 18. In this latter case, the strut 26 and its mounting 27 will also be located behind the leg casing. As shown in FIG. 1, in the undercarriage extended position the axis passing through the pivot 19 and the spindle 21 is substantially aligned with the axis of the damper. It will be noted that the pivotal connection 25 of the strut 26 to the lever member 24 and a pivotal connection 20 of the telescopic strut 10 to the lever 18 are disposed on respective sides of the line 19–21.

A lateral bracing member 28 shown in the drawings is of the double-alignment type, but it can be of any other suitable structure. It is connected at 29 to the leg casing 6 and at 30 to the aircraft. An operating jack 31 is pivotally connected at 32 to the leg casing 7 and at 33 to the aircraft.

The above-described undercarriage operates in the following manner:

In the undercarriage extended position the undercarriage operates like the known trailing wheel undercarriages, that is to say, when the aircraft carrying the undercarriage lands, and during taxying, the damper 8 is compressed under the action of the forces imparted to it by contact with the ground, and opposes its internal force, while the telescopic strut 10 is reduced in length without opposing any resistant force, that is to say, its rod $10_1$ slides freely in the cylinder $10_2$.

When the undercarriage is laterally raised, by contraction of the jack 31, the lever 18, actuated by the strut 26, pivots relative to the leg casing 6 about the pivot spindle 21, which causes rotation of the arm 4 relative to the leg 6, about the pivot member 5, by way of the telescopic strut 10 which is in a traction abutment condition. This results in retraction of the wheels 2 and 3 from the position shown in solid lines, to the position shown in dash-dotted lines, in FIG. 2.

The mounting points 9 and 20 of the telescopic strut 10 on the arm 4 and on the lever 18 respectively are different respectively from the mounting points 7 and 19 of the damper 8, with the result that during the undercarriage lifting movement the damper 8 is forced to be compressed under the action of the telescopic strut 10, until a predetermined position is reached, then it is partially re-extended at the end of the undercarriage lifting movement. For this reason the internal force exerted by the damper 8 acts like a compensating spring in opposition to the operating jack 31 during the first part of the undercarriage lifting movement, and then assists the operating jack in the course of the second part of the lifting movement.

Conversely, when the undercarriage is lowered, for example in an emergency, that is to say, when the operating jack is defective, the internal force exerted by the damper 8 is partially opposed to the external driving forces acting on the undercarriage, such as the weight of the undercarriage, during the first part of the undercarriage lowering movement, then assists the undercarriage in its lowering movement and in its locking action when the weight of the undercarriage has become a resisting force.

The different phases of extension of the undercarriage are shown in FIGS. 3 to 5. FIG. 3 shows the equilibrium condition of the lever 18 about the pivot spindle 21 in the undercarriage raised position, the external forces being assumed as zero. The force F1 of the damper 8 gives rise to a pulling force Q1 in the telescopic strut 10, which is necessary for equilibrium of the arm 4. The resultant R1 of these two forces acting on the lever 18 is balanced by the pulling force N1 of the strut 26, whose moment relative to the pivot axis 15–17 partially opposes the lowering of the undercarriage.

When the first part of the lowering movement of the undercarriage is completed, that is to say, just before the weight of the undercarriage has become a resisting force, the system passes through a position in which the action of the damper is neutral, as shown in FIG. 4. The force F2 of the damper and the corresponding force Q2 of the telescopic strut produce a resultant which is the force R2 passing through the spindle 21. For this reason the force N2 in the strut 26 is zero.

Finally, beyond this position and as shown for example, in FIG. 5, in the undercarriage extended position, the resultant R3 of the force F3 of the damper and the corresponding force Q3 of the telescopic strut is balanced by the compression force N3 of the strut 26, whose moment relative to the pivot axis 15–17 assists in extending the undercarriage. This moment can cause total extension and locking of the undercarriage when the hydraulic system is defective.

We claim:

1. A trailing-wheel undercarriage train for an aircraft including a fuselage, comprising: two laterally retractable undercarriages, pivotally mounted symmetrically on either side of the fuselage, each including a rigid leg casing on which a pivot arm is pivotally mounted; said arm carrying at least one wheel with which it constitutes an assembly, and also carrying a lower pivot of a damper disposed rearwardly of said casing, and whose upper end is pivotally connected to a lever which is pivotable during the undercarriage-train lifting movement, relative to said casing; said lever being connected, on the one hand, to a strut assembly directly pivoted on the aircraft and, on the other hand, to said arm by way of a telescopic strut which, upon landing and taxying of the aircraft, is reduced in length by the reaction of the ground, without opposing any resistance, but which, during said lifting movement of the undercarriage train, under the action of an operating jack, causes retracting of said arm - wheel assembly along said casing, thereby compressing said damper.

2. The undercarriage train as defined in claim 1, wherein the axis joining the upper pivot of said damper to said lever, and the pivot of the latter to said casing is substantially aligned with the axis of said damper in the extended position of the undercarriages.

3. The undercarriage train as defined in claim 1, wherein the pivot axis of said undercarriage on the aircraft is parallel to the longitudinal axis of the aircraft.

4. The undercarriage train as defined in claim 1, wherein said lever includes a shaft pivotally carried in said casing, said shaft being fixed with respect to a lever member on which there is pivotally mounted a strut which is itself pivotally connected to the aircraft at a point different from the pivot axis of said undercarriages.

5. The undercarriage train as defined in claim 4, wherein the axis joining the upper pivot of said damper to said lever, and the pivot of the latter to said casing is substantially aligned with the axis of said damper in the extended position of the undercarriages.

6. The undercarriage train as defined in claim 5, wherein said axis between said lever and said upper damper pivot is parallel to the axis of the aircraft.

7. The undercarriage train as defined in claim 5, wherein the pivot of said strut assembly to said lever member and the pivot of said telescopic strut to said lever are disposed on respective sides of said axis of the damper so that, when said undercarriage train is lifted, said lever pivots outwardly relative to said casing, and consequently said telescopic strut applies a pulling force to said arm which carries at least one wheel.

8. The undercarriage train as defined in claim 7, wherein said axis between said lever and said upper damper pivot is parallel to the axis of the aircraft.

9. A trailing-wheel fuselage undercarriage train for an aircraft, comprising: two laterally retractable undercarriages which are pivotally mounted symmetrically on either side of the fuselage, each including a rigid leg casing pivotally mounted on the aircraft; a pivot art pivotally mounted at the lower end of said casing; said arm having an axle carrying at least one wheel; a damper pivotally connected by way of its lower end to a first mounting on said arm and by way of its upper end to a lever including a shaft pivotally mounting in said casing; a telescopic strut with traction abutment means, said strut being pivotally connected by way of its ends to a second mounting on said arm and to said lever; a lever member fixed with respect to at least a portion of said lever, a strut pivotally connected to said lever member and to the aircraft at a point different from the pivotal mounting of said casing on the aircraft; an operating jack connected to said casing and to the aircraft, for raising and lowering said undercarriages; and lateral bracing means mounted on said casing and on the aircraft; the arrangement being such that upon landing and during taxying of the aircraft, said telescopic strut is reduced in length without opposing any resistance but that, during the lifting movement of said undercarriage train, said telescopic strut is in a traction abutment position; and that, as said casing pivots about said pivotal mounting on the aircraft, said second-named strut, which is pivotally connected to said lever member, causes said lever to pivot outwardly relative to said casing so that, in a first phase of said undercarriage-train lifing movement, said telescopic strut is drawn upwardly, thus casuing said arm and said at least on wheel to be retracted upwardly, along said casing, the internal force of said damper then tending to oppose the operating action of said jack; and finally that in a second, lifting phase said damper is partially re-extended, said internal force then tending to assist said jack.

* * * * *